United States Patent [19]
O'Daniel

[11] Patent Number: 5,829,818
[45] Date of Patent: Nov. 3, 1998

[54] COVERING DEVICE FOR A VEHICLE CONTAINER

[76] Inventor: Harold W. O'Daniel, 1410 Fairhaven Dr., Mansfield, Tex. 76063

[21] Appl. No.: 884,523

[22] Filed: Jun. 27, 1997

[51] Int. Cl.⁶ ........................................................ B60P 7/04
[52] U.S. Cl. ................ 296/98; 296/100.01; 296/100.14; 296/100.11; 74/108; 74/109
[58] Field of Search ................................. 296/92, 10, 101, 296/112, 115; 160/66, 67, 68, 69, 71, 72, 243, 245; 74/108, 109

[56] References Cited

U.S. PATENT DOCUMENTS

| | | | |
|---|---|---|---|
| 3,059,487 | 10/1962 | Anderson | 74/108 |
| 3,975,047 | 8/1976 | McClellan | 296/100 |
| 4,030,780 | 6/1977 | Petretti | 296/100 |
| 4,050,734 | 9/1977 | Richard | 296/98 |
| 4,874,196 | 10/1989 | Goldstein et al. | 296/98 |
| 5,058,956 | 10/1991 | Godwin, Sr. | 298/23 |
| 5,340,187 | 8/1994 | Haddad, Jr. | 296/98 |
| 5,482,347 | 1/1996 | Clarys et al. | 296/98 |
| 5,573,295 | 11/1996 | Haddad, Jr. | 296/100 |

FOREIGN PATENT DOCUMENTS 1134-888  11/1982  Canada ..................................... 296/98
433192   8/1935  United Kingdom ................... 296/112

OTHER PUBLICATIONS

International Application No. PCT/US97/22970 PCT International Search Report completed Mar. 24, 1998.

*Primary Examiner*—D. Glenn Dayoan
*Assistant Examiner*—Jason Morrow
*Attorney, Agent, or Firm*—Charles D. Gunter, Jr.

[57] ABSTRACT

A device for covering and uncovering an opening of a container for a truck or trailer has a pair of pivotal arms that are mounted along opposite sides of the container with each arm having an outer and inner end. A cross-member is mounted between the outer ends of the pivotal arms so that the pivotal arms are coupled together. The inner end of each arm is mounted to the truck or trailer at a pivot point so that arms can be pivoted between a starting position and an end position. A flexible covering is coupled to the outer ends of the arms and is drawn or withdrawn over the opening when the arms are moved to the end and starting positions. The arms are moved by providing a convex arcuate contact portion located about the pivot point of the arm. A piston rod and cylinder are mounted adjacent the contact portion. An arm engagement member is coupled to the piston rod and cylinder and engages the contact portion of the arm so that linear movement of the arm engagement member causes the arms to pivot.

10 Claims, 4 Drawing Sheets

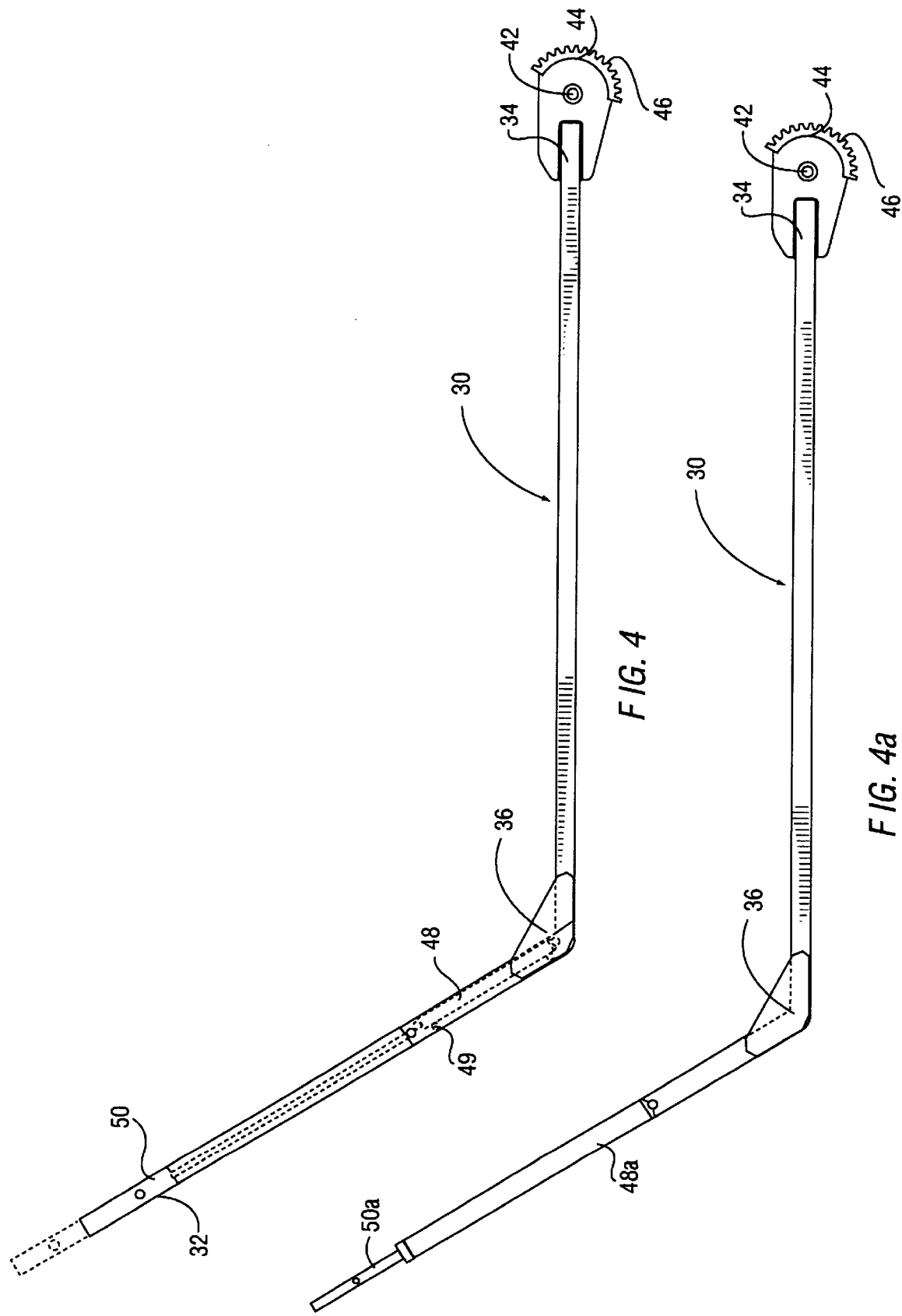

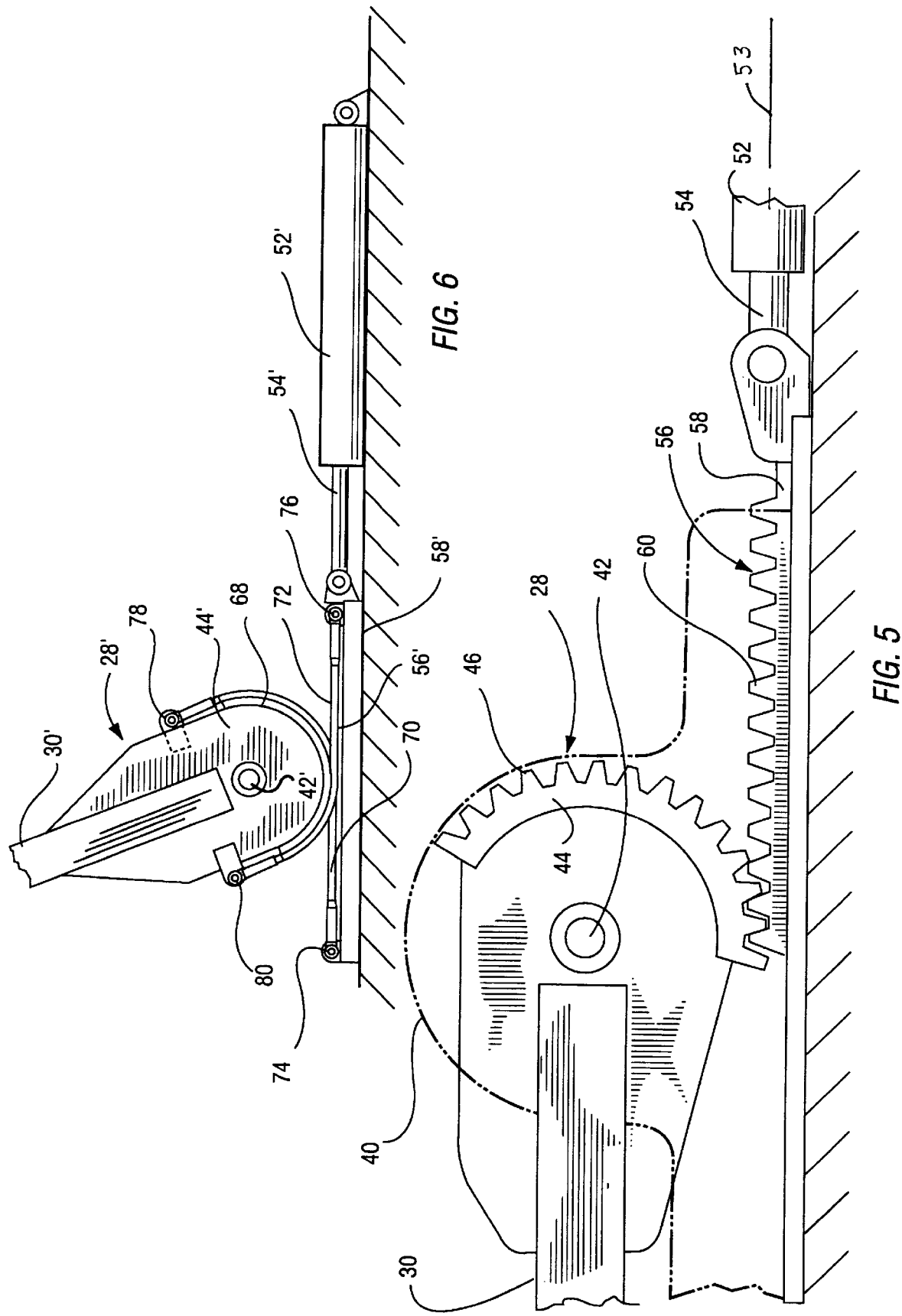

COVERING DEVICE FOR A VEHICLE CONTAINER

BACKGROUND OF THE INVENTION

1. Field of the Invention

This invention relates to devices used for covering the opening of vehicular containers that are carried by or on trucks, trailers, roll-on/roll-off hoists, and similar vehicles.

2. Description of the Prior Art

Open containers that are carried by trucks, trailers or similar vehicles that are used for hauling large amounts of loose materials are often required by law to have the opening of the containers closed or covered before they can be transported across commonly traveled or public roadways. These containers are usually rectangular an configuration, having a bottom or floor with four upright sidewalls. The top of the container is left open or uncovered to facilitate loading and unloading of the container. Materials such as grain, gravel, dirt, sand, trash, debris and a variety of other loose materials are commonly transported in these containers. Without adequate coverage of the container opening, however, these materials may be lost during transport, littering the roadways and creating possible road hazards.

Because of this, it is usually desirable to cover the container opening with a tarp or similar covering device to prevent the loss of these materials. It may also be beneficial to have the container covered to prevent rain or moisture from entering into the container and to protect the container contents. Existing state or federal highway regulations, in many cases, require that open top containers be covered during transport.

One of the problems in covering these vehicular containers is that they are typically quite large. To cover or uncover the container by hand would be very difficult and time consuming. Also, climbing upon the vehicle or container presents the possibility of bodily injury to the worker or driver. There have been several devices developed to facilitate the covering of these containers. Typically, this involves providing a roll of flexible covering material, usually mounted upon a spring loaded take-up reel or the like. A means for drawing the cover over the opening of the container is also provided.

These various means for drawing the flexible covering over the opening have varied. One such device is disclosed in U.S. Pat. No. 4,874,196. This patent discloses a device that utilizes telescoping arms operated by hydraulic pistons and cylinders that pivot while simultaneously retracting or extending to ensure that the cover is pulled along the length of the container close to the upper edge of the container opening. The disadvantage of the use of dual telescoping arms that pivot about an axis and are operated by pistons and cylinders as the arms are swung, is that the arms may have a halting or jerking motion at various positions in the arc or swing of the arms. Because of this discontinuous or un-smooth motion, it may be difficult to stop or start the swing of the arm at an intermediate position. Sometimes, the associated equipment including the telescoping arms and the bay which receives the tarp take-up reel are damaged during the arcuate travel of the arms. Further, such devices are fairly complex in design, requiring suitable controls to ensure that the telescoping arms are appropriately retracted or extended as they are pivoted.

What is needed is a device for covering the opening of a vehicular container that is simple in design and provides a smooth and reliable means for rotating or pivoting arms used for moving the covering and that can stopped or started at any desired intermediate position.

SUMMARY OF THE INVENTION

A device for covering and uncovering an opening of an open container of the type designed to be transported by a vehicle is provided with a thin, flexible covering configured to overlay the opening of the container. A pair of pivotal arms are mounted along the sides of the vehicle body and have outer ends that secure to the flexible covering. An inner end of each arm is mounted to the vehicle at a pivot point. This allows the arms to be pivoted about the pivot point between a starting position and an end position so that the flexible covering is drawn over the opening when the arms are moved to the end position and withdrawn from the opening when the arms are moved back to the starting position. The inner end of each arm also has a convex arcuate contact portion which is located about the pivot point.

A piston rod and cylinder are mounted to the vehicle adjacent to the inner end of the arm. The piston rod and cylinder have an axis that is maintained in a fixed position relative to the vehicle on which it is mounted during actuation of the piston rod and cylinder.

An arm engagement member is coupled to the piston rod and cylinder and is moved linearly between a first and second position along a line parallel to the axis of the piston rod and cylinder when the piston rod and cylinder are actuated. The arm engagement member has engagement means for engaging the contact portion of the arm so that linear movement of the arm engagement member causes the arm to pivot about the pivot point between the starting position and end positions as the arm engagement member is moved between the first and second positions.

In one particular embodiment, the arm engagement member includes a bar and the engagement means includes teeth formed on the bar that mesh with gear teeth that are formed on the arcuate contact portion forming a rack and pinion arrangement. A cross-member may also be provided that extends between and is mounted to the outer ends of the first and second pivotal arms, with the flexible covering being secured to the cross-member. The first and second pivotal arms pivot together about the first and second pivot points when the first pivotal arm is pivoted between the starting position and end position.

Additional objects, features and advantages will be apparent in the written description which follows.

BRIEF DESCRIPTION OF THE DRAWINGS

FIG. 4 is an elevational side view of an arm of the covering device constructed in accordance with the invention;

FIG. 4a is a view similar to FIG. 4 showing another embodiment of the arms and arm extensions of the device of the invention;

FIG. 5 is an elevational side view of an arcuate contact member of the arm of FIG. 4, shown engaged with an arm engagement member of the covering device and constructed in accordance with the invention;

FIG. 6 shows an alternate embodiment of the arcuate contact member of the covering device utilizing flexible lines on the arm engagement member and constructed in accordance with the invention.

DETAILED DESCRIPTION OF THE INVENTION

Figure 2:
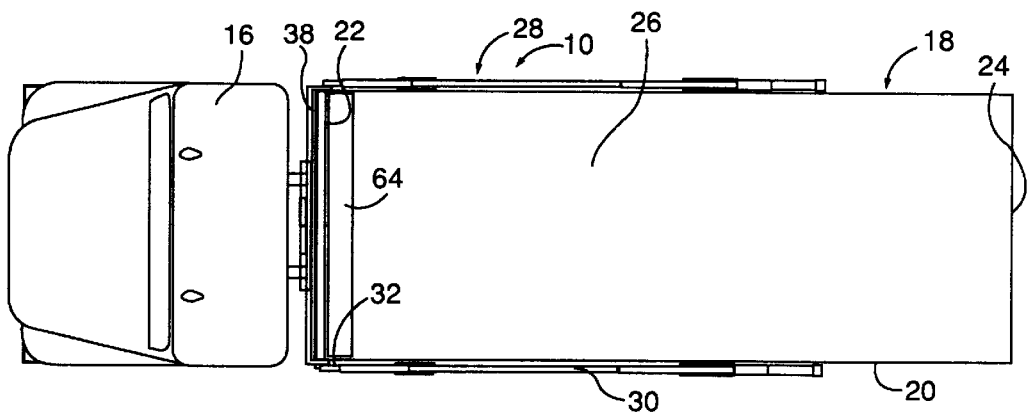
FIG. 2 is a top plan view of the truck of FIG. 1.
Figure 1:
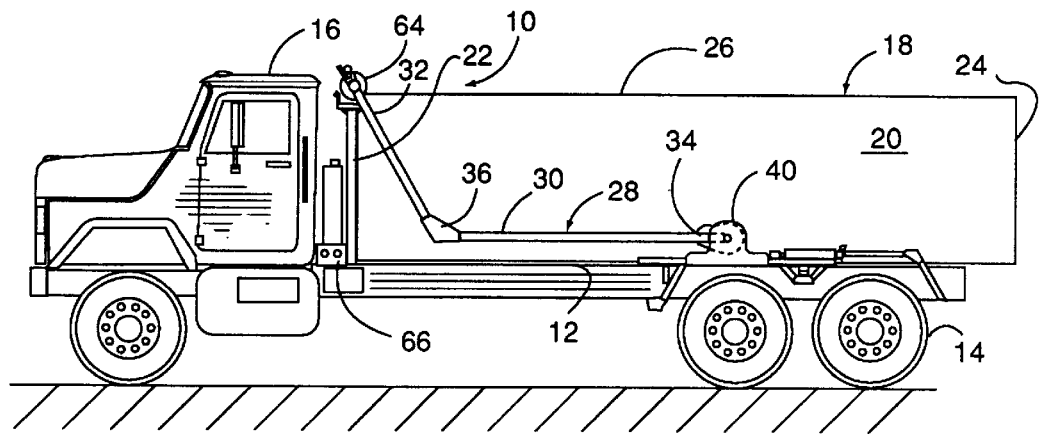
FIG. 1 is an elevational side view of a truck having a container mounted on a bed of the truck and which shows a covering device constructed in accordance with the invention.

Referring to the figures, FIG. 1 shows a truck 10 having a horizontal bed 12 which is carried on wheels 14. Located at the forward end of the truck 10 is a cab 16, which houses the engine and controls (not shown) for operating the truck 10. Rearward of the cab 16 is a container 18. The container 18 is carried upon and mounted to the bed 12 but could also go upon a trailer as well. The container 18 is constructed generally as a box having a rectangular configuration with opposite, upright sidewalls 20, which run parallel along the length of the bed 12. The bed 12 of the truck 10 forms a floor of the container 18. Alternatively, a separate floor may be mounted over the bed 12 of the truck 10 so that the container is carried thereon. Upright end walls 22, 24 are located at opposite ends of the container 18 and joined between the sidewalls 20. The walls 20, 22, 24 define the perimeter of the container 18. The container 18 is open at the top along generally its entire length from the forward end wall 22 to the rearward end wall 24. It should be apparent to those skilled in the art that the container 18, although shown mounted upon truck 10, could also be mounted upon a trailer for towing by a suitable tow vehicle. It should also be apparent to those skilled in the art, that the container 18 may be of the type that is pivotable, such as those used on dump trucks and the like, or may be stationarily mounted to the frame of the trailer or truck or other transport device. The container can be pulled onto a roll-on/roll-off hoist unit, as well.

Figure 3:
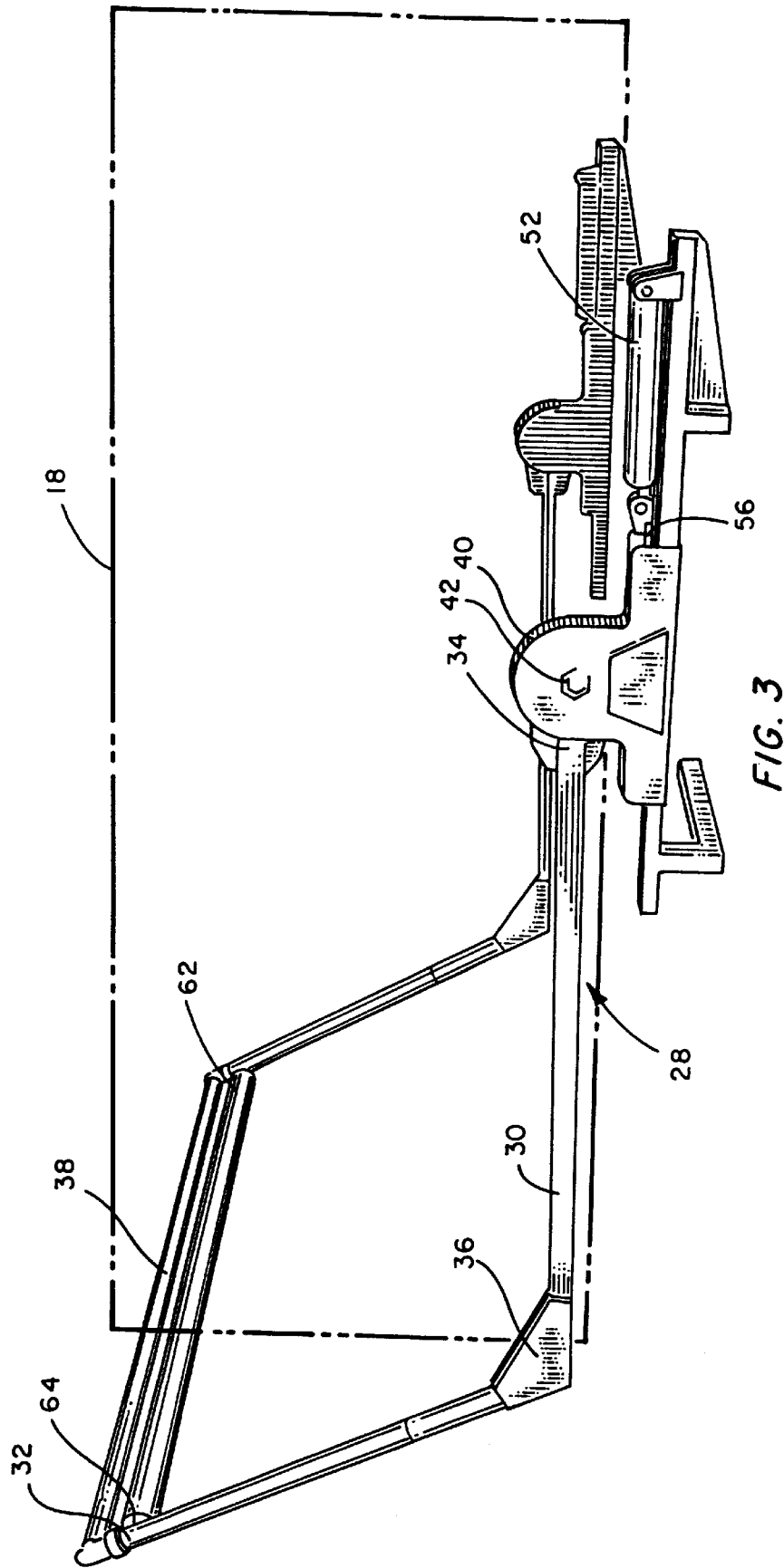
FIG. 3 is an isolated, perspective view of the covering device constructed in accordance with the invention.

A covering device 28, which can be more clearly seen in FIG. 3, is provided with the truck 10 and its container 18. The covering device 28 is comprised of a pair of pivotal arms 30 which are laterally spaced apart and located at opposite sides of the container 18, adjacent to each sidewall 20. The arms 30 may be formed of tubular steel or other material that is structurally suitable for the purposes described herein. The arms 30 each have an outer end 32 and an inner end 34. The arms 30 have a bend or angled portion 36 so that that portion of the arm 30 near the outer end 32 is angled slightly forward and upward in relation to that portion of the arm 30 near the inner end 34 when the arms 30 are in the starting position shown in FIG. 1. When the arm 30 is in the starting position, the innermost portion of the arm 30 is generally horizontal or parallel to the bed 12 of the truck 10. The angle between the outer and inner end portions of the arms 30 is an obtuse angle between approximately 100 to 120 degrees. Preferably, the outer end portion of the arm 30 should be of sufficient length so that the outer end 32 is located at a position near the top or uppermost edge of the container 18.

A cross member 38 extends between and is joined to the outer ends 32 of the arms 30. The inner end 34 of the arms 30 is pivotally mounted to a mounting 40 so that the arms 30 pivot about a pivot point 42 (FIG. 4) of the arm 30.

Each of the arms 30 has a convex, arcuate contact member or portion 44 (FIG. 5) that is located about the pivot point 42. The outer periphery of the contact portion 44 is radially spaced from the pivot point 42 an equal distance about the pivot point 42. As shown in FIG. 4, this contact portion or member 44 extends along an arc of generally about 180° in length. Provided on the periphery of the contact member 44 are a plurality of gear teeth 46 which extend radially outward from the periphery of the contact portion 44.

In one embodiment of the invention, a piston rod and cylinder assembly 48 is mounted to the outer portion of the arm 30. As shown in FIG. 4, this piston rod and cylinder 48 may be housed within the tubular steel which forms the arm 30. Alternatively, it may be mounted to the arm exterior. The piston rod and cylinder 48 are coupled to an arm extension 50 located or forming the outer end 32. The arm extension 50, as shown in the embodiment of FIG. 4, is formed of smaller diameter tubular steel so that it is received within the larger diameter tubular steel forming the arm 30. The piston rod and cylinder 48 allow arm extension 50 to be moved between an extended position, as shown by the dotted outline of FIG. 4, and a retracted position. The piston rod and cylinder 48 is provided with hydraulic fluid connections 49 for providing pressurized hydraulic fluid to actuate the piston and cylinder 48. FIG. 4a shows another embodiment of the invention in which the cylinder 48a is attached to the arm 30 and actually forms the end of the arm. The cylinder rod 50a forms the arm extension, in this case, and is moved between the retracted and extended positions by actuating the fluid cylinder 48a with suitable hydraulic means (not shown).

In either case, the arm extension (50 or 50a) is normally only actuated to accommodate a different height container so that the arm 30 completely extends across the open top of the container. The arm extensions would not normally be actuated during pivotal movement of the arm itself between the starting and end positions. As shown in Applicant's FIG. 7, the arm forms a wide arc of the top of the vehicle container and it is not necessary to use the arm extensions 50, 50a to, e.g., accommodate changes in the level of material present in the container 18.

Figure 7:
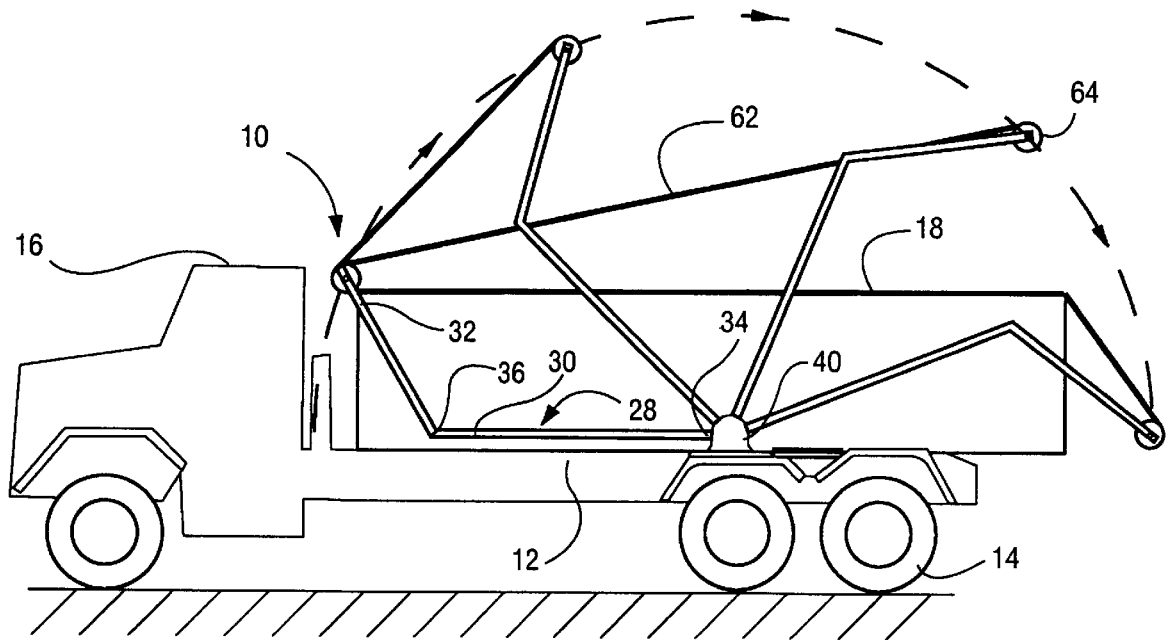
FIG. 7 is a schematic view of the truck utilizing the covering device and showing various positions of the arms as they are used to draw a flexible covering over the container.

The device of the invention features a novel arm engagement and drive mechanism for moving the arms 30 thru the path of travel illustrated in FIG. 7. Located adjacent to the inner end 34 of each arm 30 is a piston rod and cylinder 52 (FIG. 3). The piston rod and cylinder is mounted to the frame or bed 12 of the truck 10 adjacent the inner end 34 of the piston rod 30 but spaced apart therefrom. The piston rod and cylinder 52 have a common axis (53 in FIG. 5) that is oriented horizontally or parallel to the frame or bed 12. The piston rod and cylinder 52 are mounted to the bed 12 of the truck 10 so that the axis 53 of the piston rod and cylinder 52 is maintained in a fixed position relative to the truck 10 when the piston rod and cylinder 52 are actuated. Mounted to the piston rod 54 which extends from cylinder 52 is an arm engagement member 56 which is aligned with the horizontal axis 53 of the piston rod and cylinder 52. In the embodiment of FIG. 5, the arm engagement member 56 is comprised of a rack formed from a steel bar 58 having a plurality of upward projecting teeth 60. The teeth 60 are configured to engage or intermesh with the gear teeth 46 of the contact member 44, forming a rack and pinion arrangement. As such, the piston rod 54, cylinder 52 and engagement member 56 comprise drive means for engaging the convex arcuate contact portion of the arm inner end for moving the pivotal arm between the starting position and the end position, the drive means including an actuable component (bar 58) which moves in a linear direction in a plane parallel to the frame length.

A thin, flexible covering, such as a canvas tarp 62, is mounted upon a spring-loaded take-up reel 64, as shown in FIG. 3. In the embodiment shown, the take-up reel 64 is mounted between the outer ends 32 of the arms 30. The free end of the tarp 62 is then connected or secured to the truck near the forward end 22. Alternatively, the take-up reel 64 may be mounted to the truck 10 near the end 22 of the container 18. The free end of the flexible covering 62 would then be secured to the covering device 28 at the outer end 32 of the arms 30, such as by securing it to the cross-member 38.

A control panel 66 (FIG. 1) is provided on the truck 10 to allow an operator to actuate the cylinders 48, 52 using conventional, commercially available hydraulics.

FIG. 6 shows an another embodiment of the arm engagement and drive mechanism wherein the convex arcuate contact member 44' is in the form of a wheel or sheave 68. The arm engagement member 56' is provided with two flexible lines or cables 70, 72. The cable 70 is attached at one end to attachment point 74 of the outer end of the bar 58'. Similarly, one end of the cable 72 is attached at attachment point 76 at the opposite end of the bar 58'. The other ends of cables 70, 72 are attached to the wheel 68 at attachment points 78, 80, respectively. The attachment points 78, 80 are each located on opposite sides of the pivot point 42' and are spaced radially outward therefrom. The wheel 68 may be provided with circumferential grooves (not shown). Each cable 70, 72 has an intermediate portion which wraps around the sheave or wheel 68 about the pivot point 42' and is received in the grooves. The cables 70, 72 should be fairly tight so that they are both placed under tension. In this way, if the arm engagement member 56' is at an intermediate position, the cables 70, 72 will hold the arms 30' securely in place so that they will not swing about the pivot point 42'.

Other arm engagement and drive mechanisms can also be envisioned such as a chain drive which would engage the gear teeth 46 of the mounting 40.

The operation of the device is as follows. Depending upon the length of the container 18, the arm extensions 50 may be extended or retracted utilizing the piston rod and cylinder 48, which is controlled by an operator from control panel 66. The piston rod and cylinders 48 for each arm 30 should actuated together so that the arm extensions 50 are moved together an equal amount. For longer-length containers, the arms 30 may be extended, whereas for shorter-length containers, the arms 30 may be retracted a desired amount. Preferably, the arms 30 are extended so that the outer ends 32, which carry the take-up reel 64, project above the upper edge of the container 18 when the arms 30 are in the fully retracted position.

When the arms 30 are at the desired length and the flexible covering 62 is mounted between the arms 30 on the take-up reel, one end of the flexible covering 62 is secured to the forward end of the container 18 or to the truck 10. If the container 18 is pivotal, such as the container on a dump truck, the flexible covering 62 is preferably secured to a portion of the truck 10 that remains stationary. Further, the arms 30, take-up reel 64 and cross member 38 should be in such a position when fully retracted as to remain clear of the container 18 as it is pivoted.

Initially, the arms 30 should be in the starting position shown in FIG. 1 so that the inner end portion of the arm 30 is generally horizontal or parallel with the bed 12 of the truck 10. For ease of discussion, movement of the contact member 44 and arm engagement member 56 is with reference to FIG. 5. It should be readily apparent, however, that the orientation and movement may be varied. Utilizing the control panel 66, the piston rods and cylinders 52 for each arm 30 are actuated together so that the piston rods 54 are extended. It should be noted that the axis of the piston rods and cylinders 52, relative to the truck or truck bed 12, remain fixed during the entire operation. The cylinders 52 are mounted parallel to the plane of the truck bed 12. When the piston rods 54 are extended, the arm engagement member 56 of FIG. 5 is thus moved from right to left. The teeth 60 engaged with the gear teeth 46 of the contact member 44 cause the arcuate contact member 56 to rotate clockwise. The teeth 46 move thru an arcuate path of travel, much like a planetary gear system, encompassing a near infinite number of intermediate points. Movement of the arcuate contact member 56 causes the arms 30 to be swung rearward about the pivot point 42 in the direction of the arrow, as shown in the schematic of FIG. 7. As this occurs, the flexible covering 62 is unrolled from the take-up reel 64 and is drawn over the top of the container 18 across the opening 26. The covering 62 is kept taut by means of the spring tension from the take-up reel 64. With the arms 30 in the end position illustrated on the rightmost side of FIG. 7, the covering 62 is drawn over the entire length of the opening 26 of the container 18. The outer ends 32 of the arms 30 will extend rearward from the rearward end of the container 18 and will be angled downward, as shown in FIG. 7, to ensure that the covering 62 is securely held over the opening 26.

To retract the arms 30 and uncover the container 18, the control panel 66 is used to actuate the piston rod and cylinder 52 for each arm 30 in the reverse direction. Again, the piston rod and cylinder 52 for each arm 30 should be synchronized so that both are actuated simultaneously. During retraction of the arms 30, the arm engagement member 56 is moved rearwardly, or from left to right as viewed in FIG. 5. The gear teeth 46 engage the teeth 60 mounted upon the bar 58 so that the arcuate contact member 44 is rotated counterclockwise, with the arms 30 being swung or rotated about the pivot point 42 towards the forward end of the container 18. The flexible covering 62 is thus withdrawn from over the opening 26 of the container 18. Slack in the covering 62 is rolled onto the spring-loaded reel 64 as the arms 30 are moved back to the starting position of FIG. 1. When the arms 30 have completed the path of travel, the opening 26 will be completely uncovered.

The operation of the covering device using the arcuate contact member 44' and flexible lines 70, 72 of FIG. 6 is generally the same. Movement of the arm engagement member 56' will cause the arms 30' to pivot about the pivot points 42'. For ease of reference, movement of the contact member 44' and arm engagement member 56' is with reference to FIG. 6. When the arm engagement member is moved from right to left, the flexible line 70 attached at attachment point 78 on the wheel 68 causes the wheel 68 to rotate clockwise. This causes the arms 30' to swing about the pivot point 42' towards the extended or end position. By moving the arm engagement member 56' from right to left, the cable 72 acts on attachment point 80 and causes the wheel 68 to rotate counterclockwise. This causes the arms 30' to swing towards the retracted or starting position.

The covering device of the invention has several advantages. The device is simple to operate and easily constructed. The linear motion of the piston and cylinder used to rotate the arms of the covering device is smooth and can be easily stopped or started from any intermediate position. The gear teeth or cables of the arm engagement member keep the arms rigidly fixed in position about the pivot point so that they do not sway or swing when at such intermediate positions thereby eliminating jumpy movement. The device can be used with fixed containers or containers for dump trucks, roll-on/roll-off hoist units and similar devices. The arm extensions allow the device to be used on containers of varying lengths and sizes.

While the invention has been shown in only some of its forms, it should be apparent to those skilled in the art that it is not so limited but is susceptible to various chances without departing from the scope of the invention.

I claim:

1. A device mounted upon a frame of a vehicle for covering and uncovering an opening of an open container mounted upon the frame of the vehicle comprising:

a thin, flexible covering that is configured to overlay the opening of the container;

a pivotal arm which mounts along one side of the container, the arm having an outer end that couples to the flexible covering and an inner end that is mounted to the vehicle frame along a length of the frame at a pivot point so that the arm can be pivoted about the pivot point between a starting position and an end position, and wherein the flexible covering is drawn over the opening when the arm is moved to the end position and withdrawn from the opening when the arm is moved to the starting position, and wherein the inner end of the arm has a convex arcuate contact portion located about the pivot point;

a piston rod and associated cylinder that mount to the vehicle adjacent to the inner end of the pivotal arm but spaced apart therefrom, whereby the piston rod extends outwardly from the cylinder along a horizontal axis that is maintained in a fixed position relative to the vehicle on which it is mounted during actuation of the piston rod and cylinder;

an arm engagement member that is connected to the piston rod and aligned with the horizontal axis of the piston rod and cylinder, the arm engagement member being moved linearly between a first and second position along the horizontal axis of the piston rod and cylinder when the piston rod and cylinder are actuated, the arm engagement member having associated engagement means for engaging the contact portion of the pivotal arm so that linear movement of the arm engagement member causes the arm to pivot about the pivot point between the starting and end position when moved between the first position and second position.

2. The device of claim 1, wherein:

a plurality of gear teeth are formed on the arcuate contact portion of the pivotal arm; and the arm engagement member includes a bar and the engagement means includes teeth formed on the bar that mesh with the gear teeth of the arcuate contact portion.

3. A device mounted upon a frame of a vehicle for covering and uncovering an opening of an open container mounted on the frame of the vehicle comprising:

a thin, flexible covering that is configured to overlay the opening of the container;

a pivotal arm which mounts along one side of the container, the arm having an outer end that couples to the flexible covering and an inner end that is mounted to the vehicle at a pivot point so that the arm can be pivoted about the pivot point between a starting position and an end position, and wherein the flexible covering is drawn over the opening when the arm is moved to the end position and withdrawn from the opening when the arm is moved to the starting position, and wherein the inner end of the arm has a convex arcuate contact portion located about the pivot point;

a piston rod and cylinder that mount to the vehicle adjacent to the inner end of the arm, the piston rod and cylinder having an axis that is maintained in a fixed position relative to the vehicle on which it is mounted during actuation of the piston rod and cylinder;

an arm engagement member that is coupled to the piston rod and cylinder, the arm engagement member being moved linearly between a first and second position along a line parallel to the axis of the piston rod and cylinder when the piston rod and cylinder are actuated, the arm engagement member having engagement means for engaging the contact portion of the arm so that linear movement of the arm engagement member causes the arm to pivot about the pivot point between the starting and end position when moved between the first position and second position;

wherein the arcuate contact portion is a sheave; and the arm engagement member includes a bar and the engagement means includes a flexible line attached to the bar at one end and at the other end to the inner end of the arm, the flexible line having an intermediate portion that wraps around the sheave so that linear movement of the bar causes the arm to pivot about the pivot point.

4. The device of claim 3, wherein:

there are two flexible lines, each of the lines being attached at one end to opposite ends of the bar and at the other end to the inner end of the arm at opposite circumferential sides of the sheave with the intermediate portions of the lines wrapping around the sheave so that linear movement of the bar in one direction causes the arm to pivot about the pivot point towards the end position and linear movement of the bar in the other direction causes the arm to pivot about the pivot point towards the starting position.

5. The device of claim 1, further comprising:

a second pivotal arm that mounts along the side of the container opposite the first pivotal arm, the second pivotal arm having an outer end and a inner end that is mounted to the vehicle at a second pivot point so that the second arm can be pivoted about the second pivot point;

a cross member that extends between and is mounted to the outer ends of the first and second pivotal arms, with the flexible covering being secured to the cross member;

wherein the first and second pivotal arms pivot together about the first and second pivot points when the first pivotal arm is pivoted between the starting and end positions; and wherein the outer end of each pivotal arm forms an obtuse angle with respect to the inner end thereof and wherein the device further comprises a means for adjusting the length of the pivotal arms to accommodate containers of different lengths, the means comprising an additional piston rod and associated cylinder incorporated into each pivotal arm, the piston rod of each cylinder forming the respective outer end of each pivotal arm.

6. A device mounted upon a frame of a truck or trailer for covering and uncovering an opening of an open container mounted on the frame of the truck or trailer comprising:

a thin, flexible covering configured to overlay the opening of the container;

a cross member to which one end of the flexible covering is coupled, the other end of the covering being coupled to the truck or trailer;

a pair of pivotal arms which mount along opposite sides of the container, each arm having an outer and inner end, the cross member extending between and being mounted to the outer ends of the pivotal arms so that the pivotal arms are coupled together, and wherein the inner end of each arm is mounted to the truck or trailer at a pivot point so that the arms can be pivoted about the pivot points between starting and end positions, and wherein the flexible covering is drawn over the opening when the arms are moved to the end position and withdrawn from the opening when the arms are moved to the starting positions, and wherein the inner end of at least one arm has a convex arcuate contact portion located about the pivot point;

a piston rod and cylinder that mount to the truck or trailer adjacent to the inner end of said at least one arm, and wherein the piston rod and cylinder have an axis that is maintained in a fixed position relative to the truck or trailer during actuation of the piston rod and cylinder;

an arm engagement member that is coupled to the piston rod and cylinder, the arm engagement member being moved linearly between a first and second position along a line parallel to the axis of the piston and cylinder when the piston and cylinder are actuated, the arm engagement member having engagement means for engaging the contact portion of the said at least one arm so that linear movement of the arm engagement member causes the arms to pivot about the pivot points between the starting and end positions when moved between the first and second position;

wherein the arcuate contact portion is a sheave; and the arm engagement member includes a bar and the engagement means includes a flexible line attached to the bar at one end and at the other end to the inner end of the said at least one arm, the flexible line having an intermediate portion that wraps around the sheave so that linear movement of the bar causes the arms to pivot about the pivot points.

7. The device of claim 6, wherein:

there are two flexible lines, each of the lines being attached at one end to opposite ends of the bar and at the other end to the inner end of the said at least one arm at opposite circumferential sides of the sheave with the intermediate portions of the lines wrapping around the sheave so that linear movement of the bar in one direction causes the arms to pivot about the pivot points towards the end position and linear movement of the bar in the other direction causes the arms to pivot about the pivot points towards the starting position.

8. The device of claim 6, further comprising:

means for adjusting the length of the pivotal arms to accommodate containers of different lengths.

9. The device of claim 8, wherein:

the means for adjusting the length of the pivotal arms includes a second piston rod and cylinder coupled between the inner and outer ends of each arm for extending and retracting the outer end so that the length of the each arm is adjusted.

10. The device of claim 6, wherein:

there are two convex arcuate contact portions located about the pivot point of each arm;

there are two piston rods and cylinders, one of each piston rod and cylinder mount to the container adjacent to the inner end of each arm; and there are two arm engagement members, one of the arm engagement members being coupled to each piston rod and cylinder, the arm engagement members being moved linearly along single lines relative to the container between first and second positions when the piston rods and cylinders are actuated, and wherein the arm engagement members each have engagement means for engaging the contact portion of the arms so that linear movement of the arm engagement members causes the arms to pivot about the pivot points between the starting and end positions when moved between the first and second positions.

\* \* \* \* \*